2,921,097

PRODUCTION OF INSECTICIDALLY ACTIVE COMPOUND

Hans Feichtinger, Dinslaken, Lower Rhine, and Hans-Werner Linden, Moers, Germany, assignors to Ruhrchemie Aktiengesellschaft, Oberhausen-Holten, Germany, a corporation of Germany No Drawing. Application July 1, 1958
Serial No. 745,818

Claims priority, application Germany July 7, 1957

8 Claims. (Cl. 260—648)

This invention relates to the production of insecticidally active trichloroethyl-pentachlorocyclopentadiene.

Dutch Patent No. 84,943 discloses the reaction of hexachlorocyclopentadiene with dichloroethylene in the presence of aluminum chloride to form trichloroethyl-pentachlorocyclopentadiene. This reaction results in the formation of two isomeric compounds having the composition $C_7H_2Cl_8$ and differing considerably in their physical and chemical properties. One of these compounds is a colorless crystalline substance melting at 71° C., and the other is obtained as a yellowish viscous liquid having a refractive index, $n_D^{20}$, of 1.5756–1.5765. Of these compounds, only the liquid isomer which probably consists of a mixture of 1- and 2-(1.2.2-trichloroethyl)-pentachlorocyclopentadiene - (1.3) exhibits insecticidal properties, and this material is referred to as insecticidally active trichloroethyl-pentachlorocyclopentadiene.

In accordance with the Dutch patent referred to above, the reaction of hexachlorocyclopentadiene and dichloroethylene is effected in the presence of $AlCl_3$ and at a temperature above 50° C., e.g. within a temperature range of 65–70° C. The reaction product comprising the two isomeric compounds mentioned above always contains a disproportionately large amount of the insecticidally inactive solid trichloroethyl - pentachlorocyclopentadiene which must be separated in a subsequent process while the insecticidally active liquid trichloroethyl-pentachlorocyclopentadiene is present in amount of 27.5%, based on hexachlorocyclopentadiene reacted. Thus, the solid, insecticidally inactive trichloroethyl-pentachlorocyclopentadiene is chiefly formed in the known process. A further disadvantage consists in the process of the Dutch patent is that large amounts of black-colored tarry products are always formed with evolution of gaseous hydrogen chloride. Thereby, a considerable portion of the valuable starting materials is lost.

Primary objects of the present invention are to provide for production of the insecticidally active material from hexachlorocyclopentadiene in increased projection, and in good overall yield based on the hexachlorocyclopentadiene, and without the formation of an excessive amount of tar.

It has been found that, by decreasing the reaction temperature to below 50° C., the substituting addition reaction of dichloroethylene to hexachlorocyclopentadiene can be surprisingly directed in a manner that substantially only the liquid trichloroethyl-pentachlorocyclopentadiene is formed while the formation of the solid isomeric compound is substantially repressed.

Thus, in the production of the insecticidally active, normally liquid trichloroethyl-pentachlorocyclopentadiene by contacting hexachlorocyclopentadiene and dichloroethylene (1,2 dichloroethene) under conditions effective to promote formation of the insecticidally active material and the insecticidally inactive normally crystalline material of melting point 71° C., for a time sufficient to permit reaction to a suitable extent and produce the insecticidally active material and an insecticidally inactive normally crystalline material, the invention provides the improvement of carrying out the reaction at a temperature below 50° C. to produce a reaction product containing trichloroethyl-pentachlorocyclopentadiene consisting principally of the insecticidally active material in yields of the insecticidally active material of in excess of about 30% based on the hexachlorocyclopentadiene converted.

The trichloroethyl - pentachlorocyclopentadiene produced by the reaction can consist of in excess of 50% of the insecticidally active material, and conveniently in excess of 75%, and preferably in excess of 90% of the active material. Yields of the insecticidally active material can be substantially in excess of 30%, for example they can conveniently be in excess of 50% and preferably are in excess of about 65%, the yields being figured on the basis of the hexachlorocyclopentadiene converted in the reaction.

While temperatures below 50° C. and at which a liquid phase can be maintained present in the reaction zone are within the scope of the invention, the reaction temperature is advantageously in the range of about 20°–40° C.

The suitability of the method of the invention will be readily apparent from date for the method. For example, using a reaction temperature of 40° C. and a reaction period of 12 hours, an isomer mixture consisting of 6.3% by weight of the solid and 93.7% by weight of the insecticidally active liquid trichloroethyl-pentachlorocyclopentadiene is obtained in a yield of 70.3% of the theoretically possible amount, based on hexachlorocyclopentadiene converted. The hexachlorocyclopentadiene recovered by distillation is usable for a new reaction. Thus, in contrast to the known process, the liquid trichloroethyl-pentachlorocyclopentadiene is formed in an increased yield of 65.3% of the theoretically possible amount. A still further decrease in reaction temperature to 20° C. results in isomer mixtures which contain as little as 1.5% by weight of the useless solid trichloroethyl-pentachlorocyclopentadiene.

The advantage of the new mode of operation consists not only in the preferred formation of valuable liquid products but also in a formation of tar which is extremely low as compared with the known production method. In this manner, a very good utilization of the starting material is achieved. While 142 grams of tarry residue is formed from 546 grams of hexachlorocyclopentadiene when operating in a temperature range of 65–70° C., only 30 grams of residues are formed from 648 grams of hexachlorocyclopentadiene when operating in accordance with the invention at a temperature of 40° C.

A further advantage over the process involving a reaction at temperatures in excess of 50° C. consists in the purity of the products. The separation of the insecticidally inactive solid trichloroethyl-pentachlorocyclopentadiene is particularly cumbersome and difficult if it is present as the main constituent in the isomer mixture. Since, in case of the process of the invention, the liquid trichloroethyl-pentachlorocyclopentadiene is formed in a technically high purity, the separation of the inactive solid compound is not necessary. The liquid product is capable of being directly formulated as a pesticide in the conventional manner without the necessity of using a cumbersome separation process.

Advantageously, however, the reaction product is treated to separate therefrom the insecticidally active material. This material can then be used as a pesticide.

Example 1

In accordance with the process disclosed in Dutch Patent 84,943, 546 grams (2.00 mols) of hexachlorocyclopentadiene and 30 grams (0.225 mol) of aluminum chloride, while stirring, were heated at 65° to 70° C. in a three-necked flask provided with an agitator, reflux condenser, dropping funnel and thermometer. Thereafter, 200 grams (2.06 mols) of commercial dichloroethylene were slowly added. Upon termination of the reaction, the reaction mixture was maintained at 80° C. for another hour and then poured on ice. After processing by vacuum distillation, crystallization from methanol and repeated vacuum distillation of the mother liquor, 296 grams of an isomer mixture having the empirical formula $C_7H_2Cl_8$ and consisting of about 50% by weight of the solid trichloroethyl-pentachlorocyclopentadiene melting at 71° C. and about 50% by weight of liquid trichloroethyl-pentachlorocyclopentadiene was obtained in addition to 149 grams of unconverted hexachlorocyclopentadiene. Thus, the yield of liquid compound was about 27.5% of the theoretically possible amount, based on hexachlorocyclopentadiene converted. By repeated crystallizations from methanol, additional small amounts of solid trichloroethyl-pentachlorocyclopentadiene could be isolated.

Example 2

In a stirring vessel equipped with a moisture seal, 648 grams (2.37 mols) of hexachlorocyclopentadiene, 48 grams (0.36 mols) of aluminum chloride and 240 grams (2.47 mols) of commercial dichloroethylene were heated for 12 hours at 40° C. while vigorously stirring and while maintaining the temperature at a constant level by means of an ultrathermostat. The dark colored reaction mixture was introduced into 1 liter of ice water. The oily layer which separated was dissolved in 500 cc. of carbon tetrachloride. The solution containing carbon tetrachloride was washed with water and dried over annealed sodium sulfate. After removal of the solvent and subsequent vacuum distillation, 30 grams of a black-colored tarry residue and 282.3 grams of yellowish viscous oil having a boiling range at 0.3–0.1 mm. Hg of 100–134° C. was obtained in addition to 349.9 grams of unconverted hexachlorocyclopentadiene. This oil was dissolved in methanol and allowed to stand over night at −10° C. By filtration, 17.9 grams of the solid trichloroethyl-pentachlorocyclopentadiene melting at 71° C. were separated. The mother liquor was concentrated and again subjected to vacuum distillation. This resulted in additional 5.6 grams of converted hexachlorocyclopentadiene and 258.8 grams of liquid trichloroethyl-pentachlorocyclopentadiene having a boiling range of 93–116° C. at 0.1 mm. Hg (refractive index, $n_D^{20} = 1.5765$). Taking into account the recovered amounts of hexachlorocyclopentadiene, a yield of 65.3% of the theoretically possible amount of liquid trichloroethyl-pentachlorocyclopentadiene was obtained.

Example 3

648 grams (2.37 mols) of hexachlorocyclopentadiene, 48 grams (0.36 mol) of aluminum chloride and 240 grams (2.47 mols) of commercial dichloroethylene were reacted in the manner described in Example 2. The reaction temperature was 20° C. and the reaction period was 40 hours. After processing and vacuum distillation, 418 grams of unconverted hexachlorocyclopentadiene and 222.7 grams of liquid trichloroethyl-pentachlorocyclopentadiene in form of a yellowish viscous oil having a boiling range of 105–130° C. at 0.3–0.1 mm. Hg were obtained in addition to 25 grams of a black-colored tarry residue. By dissolution in methanol and low-temperature cooling for several days at −10° C., 3.4 grams of the solid trichloroethyl-pentachlorocyclopentadiene melting at 71° C. separated. By concentration of the filtered mother liquor and repeated vacuum distillation, 216 grams of liquid trichloroethyl-pentachlorocyclopentadiene having a boiling range of 98–117° C. at 0.1 mm. Hg (refractive index, $n_D^{20} = 1.5756$) were obtained. Thus, the total yield of liquid trichloroethyl-pentachlorocyclopentadiene was 69.3% of the theoretically possible amount, based on hexachlorocyclopentadiene converted.

The liquid trichloroethyl - pentachlorocyclopentadiene obtained by the process of the invention may be used as an insecticide and its insecticidal properties are superior to those of the product obtained by the known process. As may be seen from the test results given below, the reaction products obtained at temperatures below 50° C. are substantially more efficient than those obtained by the known process. The efficiency of the pure, liquid trichloroethyl-pentachlorocyclopentadiene obtained by the process of the invention was tested on four days' old females of *Musca domestica* L. By a modified test method of W. M. Hoskins and P. S. Messenger (Agricultural Control Chemicals, Advances in Chemistry, Series 1, 1950, pages 93–98) and compared with the known insecticide 1.2.4.5.6.7.8.8-octachloro - 3a.4.7.7a - tetrahydro-4.7-endomethylene-indene (trade name "Chlordan") and with the compound obtained in accordance with Dutch Patent 84,943.

| Insecticide | Quantity applied $\gamma/cm.^2$ | Percentage of irreversibly damaged animals | |
|---|---|---|---|
| | | After 2 hours, percent | After 24 hours, percent |
| 1.2.4.5.6.7.8.8-octachloro - 3a.4.7.7a-tetrahydro-4.7-endomethylene-indene (Chlordan) | 13.7<br>6.85 | 7<br>7 | 60<br>33 |
| Liquid trichloroethylpentachlorocyclopentadiene according to Dutch Patent 84,943. | 13.7<br>6.85 | 60<br>48 | 76<br>76 |
| Liquid trichloroethylpentachlorocyclopentadiene in accordance with Example 2 and Example 3. | 13.7<br>6.85 | 100<br>100 | 100<br>100 |

The percentages given above of irreversibly damaged animals indicate that the efficiency of liquid trichloroethyl-pentachlorocyclopentadiene produced in accordance with the invention is not only superior to that of Chlordan but also to that of the product obtained by the known process.

We claim:

1. In the process for the production of insecticidally active, normally liquid trichloroethyl-pentachlorocyclopentadiene, having a refractive index, $n_D^{20}$, of 1.5756–1.5765, which comprises contacting reactant hexachlorocyclopentadiene and reactant dichloroethylene in the presence of aluminum chloride and continuing said contacting for a time sufficient to produce the said insecticidally active material, whereby there is also produced during said time an insecticidally inactive normally crystalline material of melting point 71° C. the improvement which comprises maintaining said reactants while being contacted in the presence of aluminum chloride at a temperature below 50° C. to produce a reaction product containing trichloroethyl-pentachlorocyclopentadiene consisting principally of the insecticidally active liquid material in yields of said liquid material in excess of about 30% based on the hexachlorocyclopentadiene converted.

2. The method of claim 1, wherein said reaction product is treated to separate therefrom the insecticidally active trichloroethyl-pentachlorocyclopentadiene having a boiling range of 93–117° C. at 0.1 mm. Hg and a refractive index, $n_D^{20}$, of 1.5756–1.5765.

3. The method of claim 1, wherein said temperature employed is below about 40° C.

4. The method of claim 1, wherein the reactants are maintained at below 50° C. in the presence of aluminum chloride to produce trichloroethyl-pentachlorocyclopentadiene consisting of in excess of about 90% of the insecticidally active liquid material whereby the yields of the insecticidally active material is at least 65% based on the hexachlorocyclopentadiene converted.

5. The method of claim 4, wherein said reaction product is treated to separate therefrom the insecticidally active trichloroethyl-pentachlorocyclopentadiene having a boiling range of 93–117° C. at 0.1 mm. Hg and a refractive index, $n_D^{20}$, of 1.5756–1.5765.

6. The method of claim 4, wherein said temperature is between about 20° and 40° C.

7. A method of preparation of trichloroethyl-pentachlorocyclopentadiene containing between 65 and 90% of the liquid insecticidally-active isomer, suitable to be directly formulated as a pesticide which comprises reacting hexachlorocyclopentadiene, aluminum chloride and dichloroethylene at a temperature between 20° and 40° C. for a period of time between twelve and forty hours, and recovering the product by vacuum distillation.

8. A method of controlling insect pests which comprises administering to at least one of the insects trichloroethyl-pentachlorocyclopentadiene, containing between 65 and 90% of the liquid, insecticidally active isomer, said trichloroethyl-pentachlorocyclopentadiene being prepared by reaction of hexachlorocyclopentadiene and dichloroethylene, in the presence of aluminum chloride at a temperature between 20° and 40° C.

References Cited in the file of this patent

FOREIGN PATENTS 84,943     Netherlands _____ Apr. 15, 1957